(12) United States Patent
Herto et al.

(10) Patent No.: US 6,343,008 B1
(45) Date of Patent: Jan. 29, 2002

(54) SHELF FOR TOWER PC

(76) Inventors: Alan L. Herto; Joan T. Herto, both of 8344 Stationhouse Ct., Lorton, VA (US) 22079

( * ) Notice: Subject to any disclaimer, the term of this patent is extended or adjusted under 35 U.S.C. 154(b) by 0 days.

(21) Appl. No.: 09/624,593

(22) Filed: Jul. 25, 2000

Related U.S. Application Data

(60) Provisional application No. 60/158,229, filed on Oct. 8, 1999.

(51) Int. Cl.$^7$ .................................................. G06F 1/16
(52) U.S. Cl. ...................... 361/683; 361/680; 211/86.01; 206/308.1; 220/4.03
(58) Field of Search ................................. 361/680, 683, 361/690–696; 248/918, 205.3, 311.2, 274.1, 298.1, 175.7, 188.5, 442.2, 683, 672, 220.22, 153, 318; 206/308.1, 307, 308.3, 305; 211/13.1, 86.01, 69.1, 175, 126.1, 113, 133.2, 133.5; 108/42, 147.19, 147.2, 149; 220/485, 676, 23.8, 694; D14/102, 100, 107–109; D6/421, 422, 423, 432, 436, 445, 448; D13/162, 186, 199; 312/223.1–223.3, 194; 360/99.12

(56) References Cited

U.S. PATENT DOCUMENTS

| | | |
|---|---|---|
| 4,972,962 A | 11/1990 | Price, Jr. et al. |
| 5,263,668 A | 11/1993 | Reiter |
| 5,424,912 A | 6/1995 | Mikan |
| 5,483,902 A | 1/1996 | Grosch |
| 5,588,727 A | 12/1996 | D'Agaro et al. |
| 5,590,607 A | 1/1997 | Howard |
| 5,639,060 A | 6/1997 | Spoonts et al. |
| 5,694,292 A | 12/1997 | Paulsel et al. |
| 5,717,567 A | 2/1998 | Tao |
| 5,738,320 A | 4/1998 | Matos et al. |
| 5,741,053 A | 4/1998 | Nielsen |
| 5,996,786 A | * 12/1999 | McGrath .................. 206/308.1 |
| 6,152,311 A | * 11/2000 | German .................... 211/86.01 |
| 6,202,874 B1 | * 3/2001 | Diamond ................... 220/4.03 |

* cited by examiner

*Primary Examiner*—Leo P. Picard
*Assistant Examiner*—Michael Datskovsky
(74) *Attorney, Agent, or Firm*—Richard C. Litman

(57) ABSTRACT

A shelf configured for fitting snugly over the top end of a tower PC. The shelf is a frame formed by a top wall and two side walls, each attached at opposing ends of the top wall. Each side wall is perpendicular to the top wall to form a rectangular-shape open space between the two side walls for receiving the top end of a tower PC to fit flush between the side walls. A section of foam is attached to an inner surface of each side wall for pressing against the outer wall of a tower PC when the tower PC is placed in the open space between the side walls.

8 Claims, 4 Drawing Sheets

SHELF FOR TOWER PC

CROSS-REFERENCE TO RELATED APPLICATION

This application claims the benefit of U.S. Provisional Patent Application Ser. No. 60/158,229, filed Oct. 8, 1999.

BACKGROUND OF THE INVENTION

1. Field of the Invention

The present invention relates generally to furniture used for computer equipment and, more particularly, to a shelf for supporting computer equipment on top of a tower personal computer (hereinafter referred to as a "PC").

2. Description of Related Art

The use of computers in today's business establishments is constantly growing. As a result of this growth, it has become increasingly necessary to provide some type of apparatus for conserving space and at the same time accommodate more computer control units.

A variety of devices have been proposed to increase the work space associated with personal computers by providing devices to support various computer-related accessories on areas other than the adjacent work space surrounding a computer and monitor. For example, U.S. Pat. No. 4,972,962 issued on Nov. 27, 1990 to Macy J. Price, Jr. describes an apparatus for stacking computer control units. U.S. Pat. No. 5,263,668 issued on Nov. 23, 1993 to Victor R. Reiter describes a computer pedestal for supporting a computer component in an upright orientation which can be nested with other like pedestals to permit side-by-side stowage of a plurality of computer components.

U.S. Pat. No. 5,424,912 issued on Jun. 13, 1995 describes an accessory device for mounting manually operable equipment in a stacking rack of the kind having vertically-spaced-apart front uprights. U.S. Pat. No. 5,483,902 issued on Jan. 16, 1996 describes an adjustable work surface for computer stations. U.S. Pat. No. 5,588,727 issued on Dec. 31, 1996 to Amos D'Agaro et al. describes a desktop organizer for an office workstation. U.S. Pat. No. 5,590,607 issued on Jan. 7, 1997 to Thomas E. Howard describes a portable shelf apparatus for notebook computers.

U.S. Pat. No. 5,639,060 issued on Jun. 17, 1997 to Sean K. Spoonts et al. describes a mounting bracket for computer speakers. U.S. Pat. No. 5,694,292 issued on Dec. 2, 1997 to Jason Q. Paulsel et al. describes a portable computer docking station with removable support shelf apparatus. U.S. Pat. No. 5,717,567 issued on Feb. 10, 1998 to Adam M. Tao describes a folding rack system for a mobile office. U.S. Pat. No. 5,738,320 issued on Apr. 14, 1998 to Brian E. Matos et al. describes a support shelf for computer monitors. U.S. Pat. No. 5,741,053 issued on Apr. 21, 1998 to Andreas Krestian Nielsen describes a desk pedestal for utilizing computer hardware and accessories.

None of the above inventions describe a shelf configured to fit securely over the top end of a tower PC for securely supporting computer equipment on top of the tower PC. None of the above inventions and patents, taken either singly or in combination, is seen to describe the instant invention as claimed.

SUMMARY OF THE INVENTION

The present invention is a shelf configured for fitting snugly over the top end of a tower PC. The shelf is defined by a frame formed by a top wall and two side walls, each attached at opposing ends of the top wall. Each side wall is perpendicular to the top wall to form a rectangular-shape open space between the two side walls for receiving the top end of a tower PC to fit between the side walls in a flush manner. A section of foam is attached to an inner surface of each side wall, pressing against the outer wall of a tower PC when the tower PC is placed in the open space between the side walls.

Accordingly, it is a principal object of the invention to provide a shelf configured to fit snugly over the top of a tower PC for supporting computer equipment thereon.

It is another object of the invention to provide a means for supporting computer equipment off a desktop.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
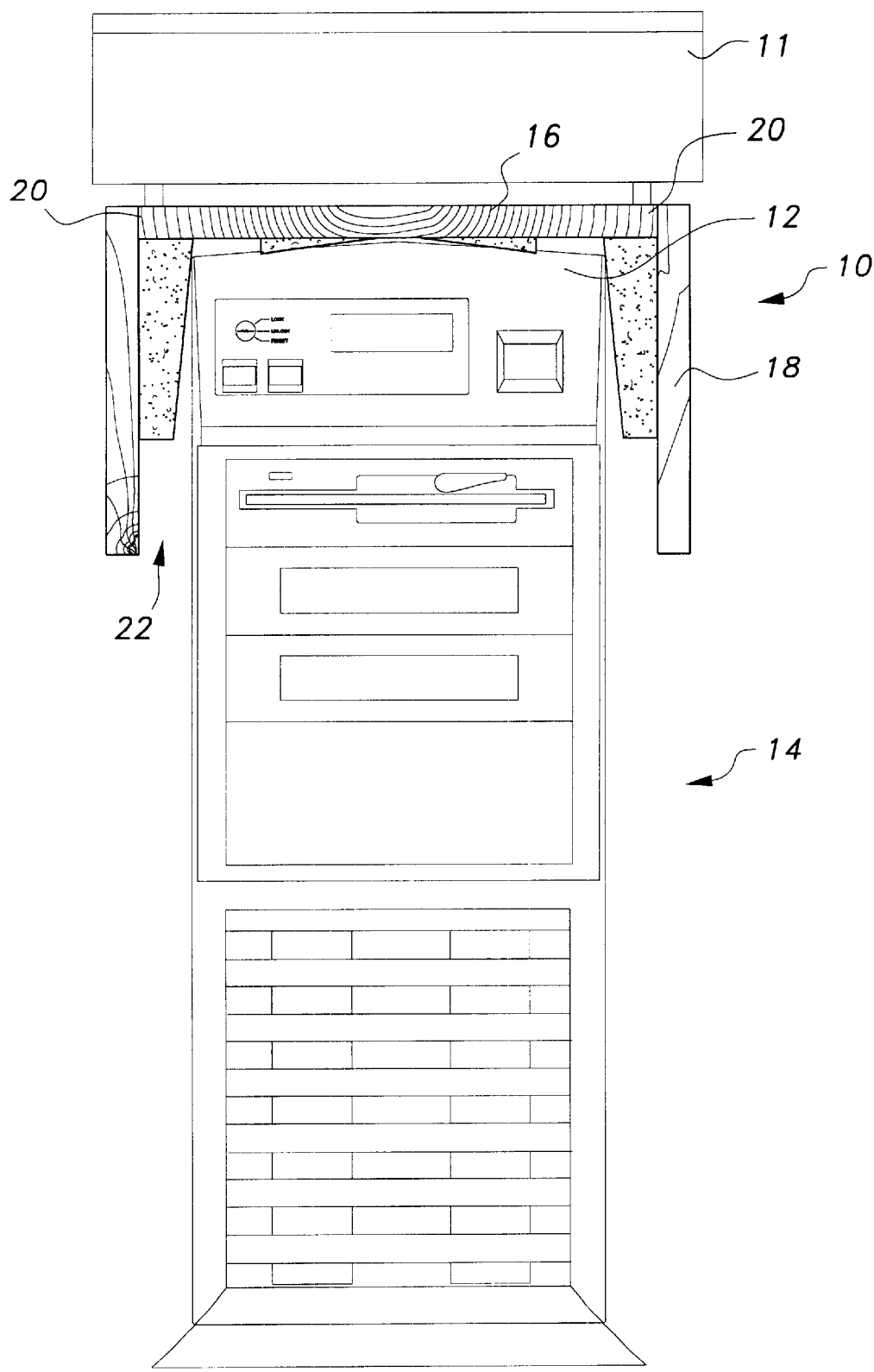
FIG. 1 is a front elevation view of a shelf for a tower personal computer according to a preferred embodiment of the present invention.
Figure 2:
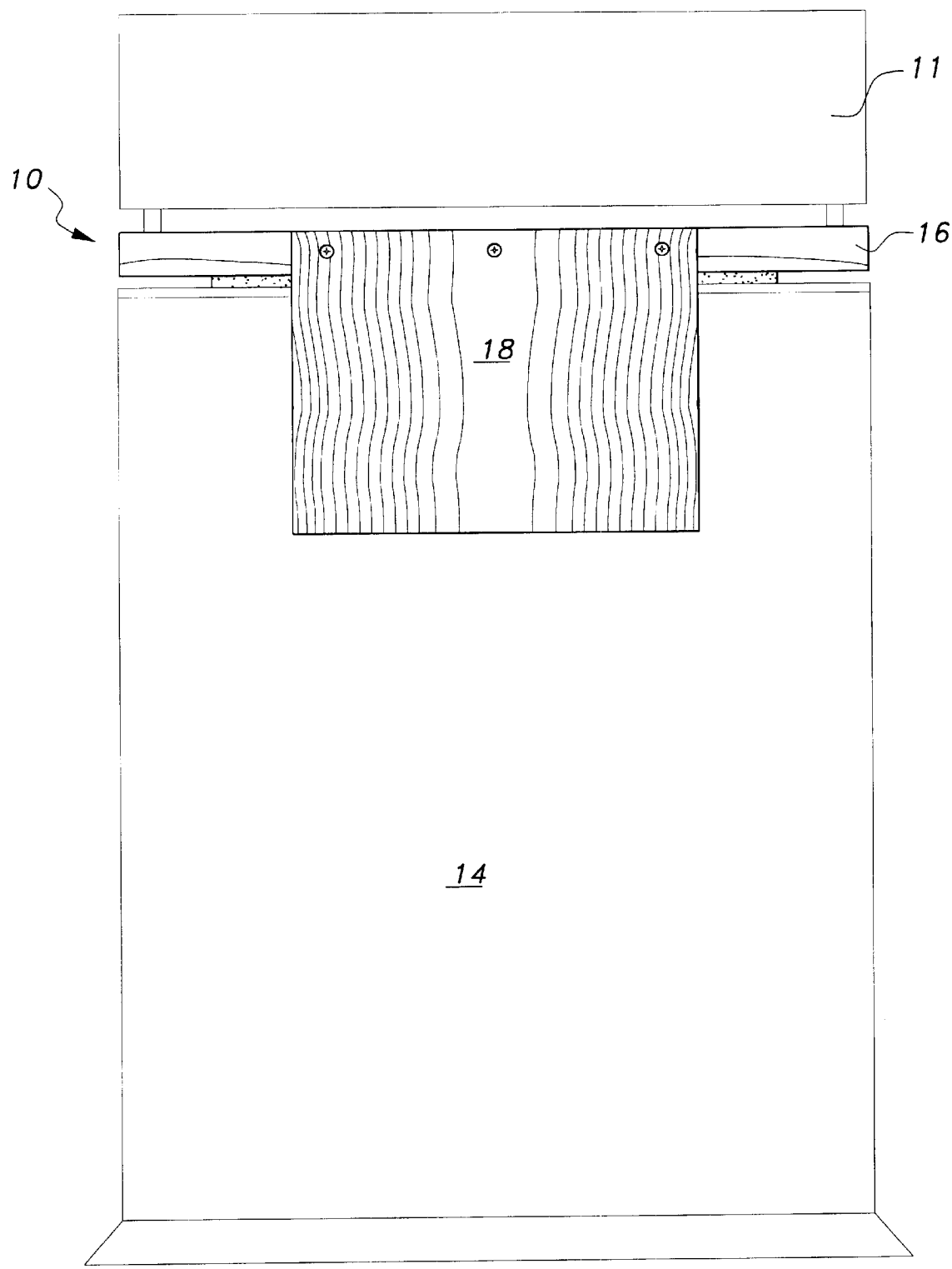
FIG. 2 is a side elevation view of the shelf for a tower PC as shown in FIG. 1.
Figure 3:
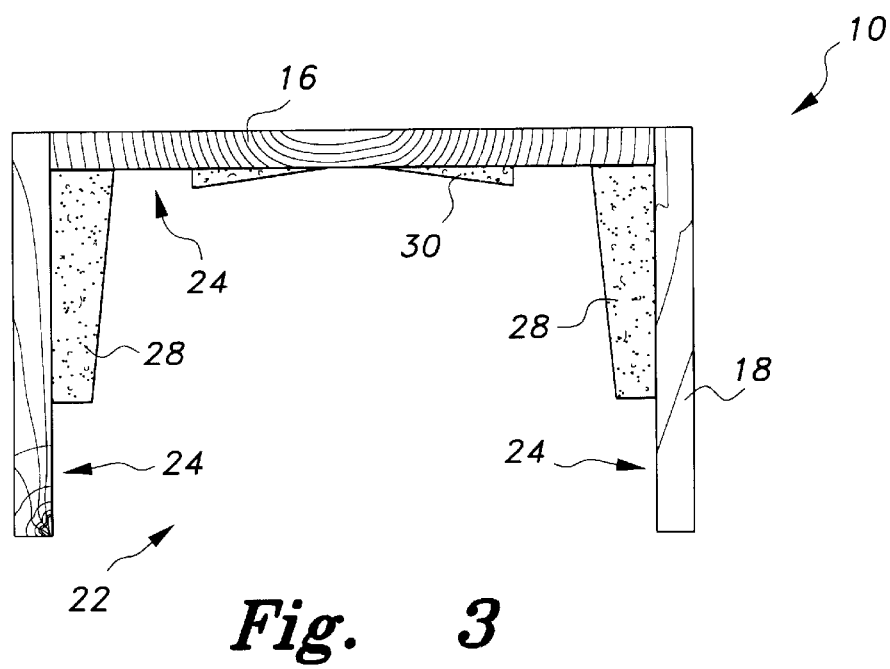
FIG. 3 is a front elevation view of the shelf alone.
Figure 4:
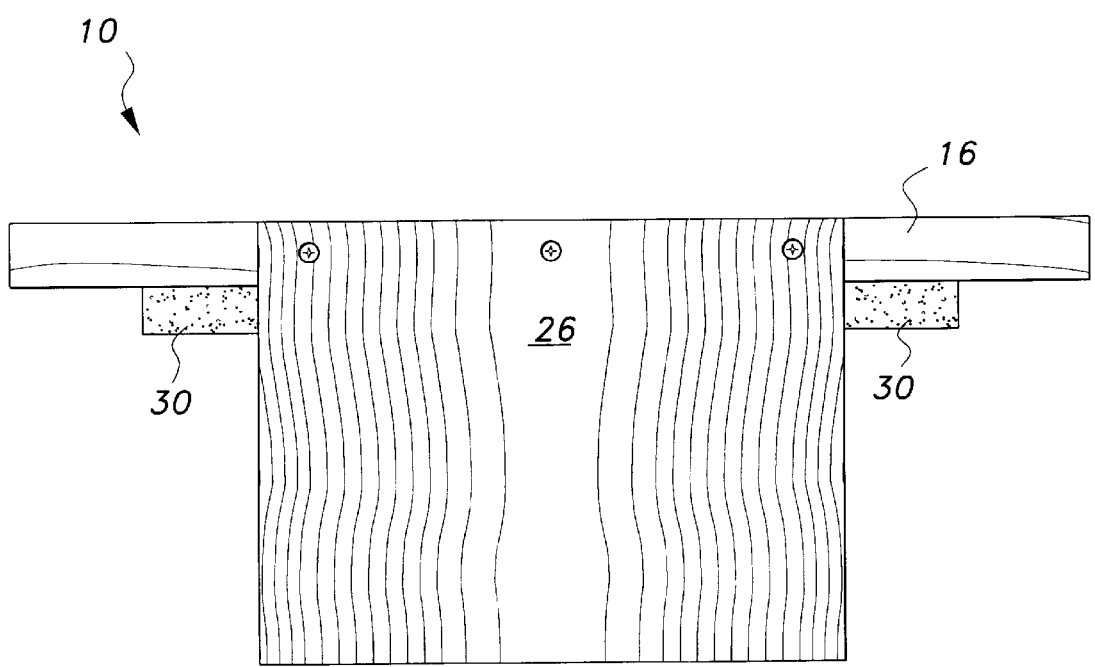
FIG. 4 is a side elevation view of the shelf alone.
Figure 5:
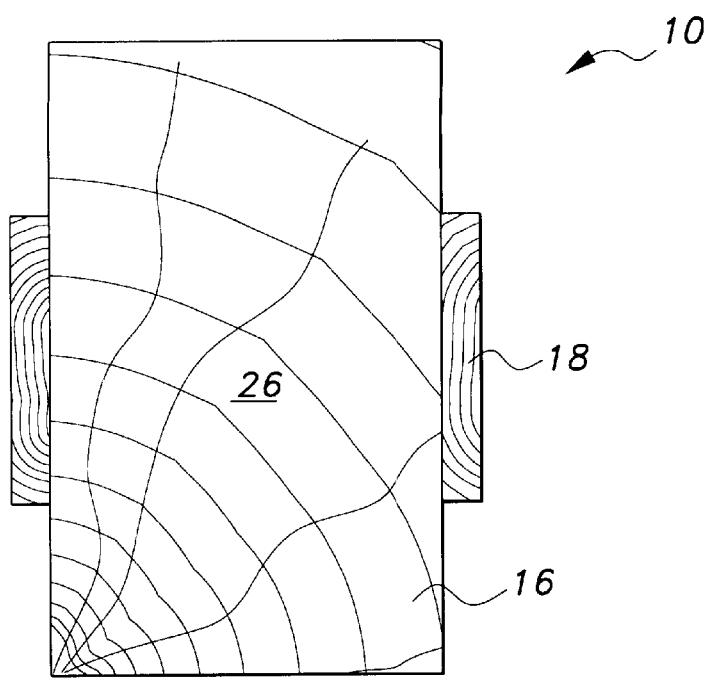
FIG. 5 is a plan view of the top of the shelf.

The present invention is a shelf for a tower personal computer, or PC. Environmental views of a shelf 10 placed on top of a tower PC are shown in FIGS. 1 and 2. The shelf is used to support a conventional scanner device 11 on top of the tower PC. Further details of the shelf may be appreciated by referring to FIGS. 3–6.

As illustrated by FIGS. 1 and 2, the shelf 10 is configured to fit over the top end 12 of a conventional tower PC 14. Preferably, the shelf 10 is defined by a top wall 16 having a side wall 18 attached perpendicularly at opposite ends 20 of the top wall 16 to form a rectangular-shaped space 22, configured and dimensioned to surmount the top end 12 of a tower PC therebetween. In one preferred embodiment, the top wall is 17×9¼ inches ×¾ inch. Each side wall is 9¼×5⅛ inches ×¾ inch.

Accordingly, each of the aforementioned walls defines an inner surface 24 and an outer surface 26 of the shelf 10. A foam section 28 of material is attached to the inner surface 24 of each side wall 18, to provide an elastic means to press outwardly from each side wall 18 against a tower PC 14 inserted therebetween. Preferably, each foam piece is wedge shaped. Each foam piece 28 is pressed against one of the side walls 18 to allow the tower PC 14 to be easily received in between each side wall 18. Thereafter, each foam piece 28 expands to press against to tower PC 14 to ensure a tight and secure fit between the shelf 10 and the tower PC 14.

Figure 6:
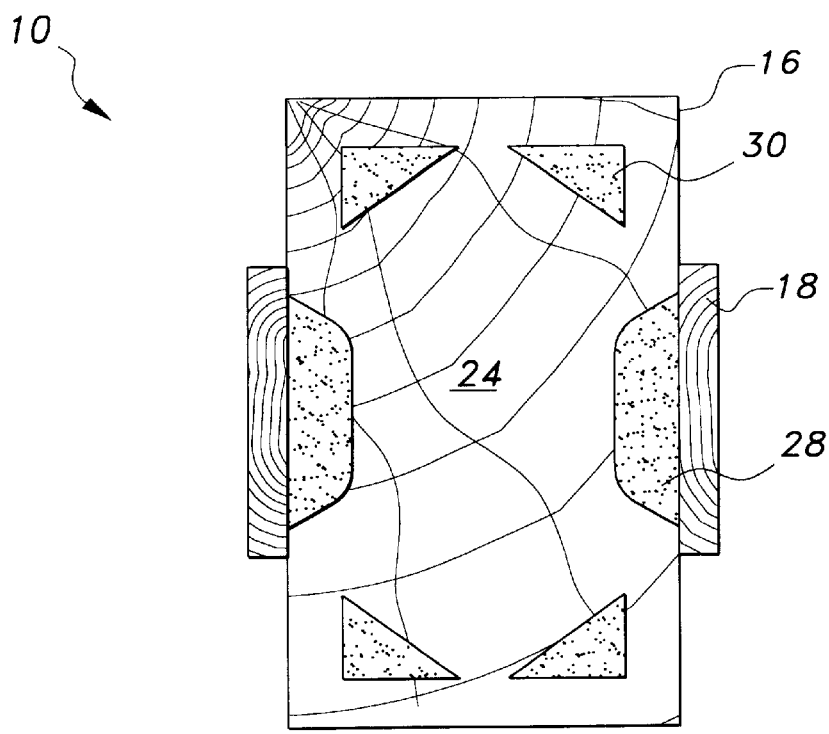
FIG. 6 is a plan view of the bottom of the shelf.

A pair of second foam pieces 30, 30 are attached to inner surfaces 24 of the top wall 16 to provide a protective barrier between the top wall 16 and the tower PC 14. Preferably, four second foam pieces 30 are attached to the top wall 16 as shown in FIG. 6, thereby distributing the protective barrier over a broader portion of the top wall 16.

It is to be understood that the present invention is not limited to the sole embodiment described above, but encompasses any and all embodiments within the scope of the following claims.

We claim:

1. A support shelf for a tower PC, comprising:

a frame comprising a top wall and two side walls, each substantially perpendicular to said top wall, and thereby forming an open space therebetween to receive a top end of a tower PC therebetween, each of said walls having an inner surface and an outer surface; and a first foam piece attached to said inner surface of each of said side walls, providing an elastic means compressed between each of said side walls against the tower PC inserted therebetween; whereby said support shelf is firmly and securely surmounted on a tower PC.

2. The support shelf claimed in claim 1, further comprising:

a second foam piece attached to the inner surface of said top wall to provide a protective barrier between said top wall and the tower PC.

3. The support shelf claimed in claim 2, wherein said second foam piece comprises four foam pieces.

4. The support shelf claimed in claim 1, wherein said first foam piece comprise four foam pieces.

5. The support shelf claimed in claim 1, wherein said top wall has dimension of approximately 17 by 9¼ inches by ¾ inch.

6. The support shelf claimed in claim 1, wherein each of said side walls has dimensions of approximately 9¼ by 5⅛ inches by ¾ inch.

7. A support shelf for a tower PC, comprising:

a frame comprising a top wall and two side walls, each substantially perpendicular to said top wall, and thereby forming an open space therebetween, such that said shelf surmounts a top end of a tower PC, each of said walls having an inner surface and an outer surface;

a wedge-shaped, first foam piece attached to said inner surface of each of said side walls, providing an elastic means compressed between each of said side walls against the tower PC inserted therebetween; and a second foam piece attached to the inner surface of said top wall to provide a protective barrier between said top wall and the tower PC; whereby said support shelf is firmly and securely surmounted on a tower PC.

8. The support shelf claimed in claim 7, wherein said second foam piece comprises four foam pieces.

* * * * *